(12) United States Patent
Krishnan et al.

(10) Patent No.: US 6,518,534 B1
(45) Date of Patent: Feb. 11, 2003

(54) WELDING APPARATUS FOR FORMING CHROMIUM OXIDE PASSIVATED FILM AT WELDED PORTION

(75) Inventors: Sowmya Krishnan, Sunnyvale, CA (US); Tadahiro Ohmi, Sendai (JP)

(73) Assignee: Ultra Clean Technology Systems and Services Inc., Menlo Park, CA (US)

( * ) Notice: Subject to any disclaimer, the term of this patent is extended or adjusted under 35 U.S.C. 154(b) by 0 days.

(21) Appl. No.: 09/755,379

(22) Filed: Jan. 5, 2001

Related U.S. Application Data

(62) Division of application No. 09/163,736, filed on Sep. 30, 1998, now Pat. No. 6,172,320.

(51) Int. Cl.⁷ .............................................. B23K 35/38
(52) U.S. Cl. ........................... 219/74; 219/76.1; 219/72
(58) Field of Search ........................... 219/74, 76.1, 72, 219/75, 101, 104, 136

(56) References Cited

U.S. PATENT DOCUMENTS

| | | | | |
|---|---|---|---|---|
| 5,597,109 A | * | 1/1997 | Ohmi et al. ................. | 228/199 |
| 5,667,133 A | * | 9/1997 | Ohmi et al. ................. | 228/219 |
| 5,916,457 A | * | 6/1999 | Ohmi ....................... | 219/69.12 |
| 5,951,787 A | * | 9/1999 | Ohmi et al. ................. | 148/280 |
| 5,961,158 A | * | 10/1999 | Ohmi ....................... | 285/288.1 |

* cited by examiner

*Primary Examiner*—M. Alexandra Elve
(74) *Attorney, Agent, or Firm*—Gregory Smith & Associates; James J. Leary

(57) ABSTRACT

An improved method for welding and passivation forms a chromium oxide passivated film over the welded portion during the welding process. In a shielding step, a backshield gas, preferably argon, is flowed around the welding site. In a welding step, an arc gas, preferably argon with approximately 10% hydrogen and less than 1 ppm moisture content, is flowed through the welding head and a welded joint is formed, for example by high speed tungsten-inert gas (TIG) orbital welding. In the passivation step, a process gas, preferably argon with approximately 30–100 ppm of oxygen and less than 1 ppm moisture content, and preferably less than 1 ppb moisture content, is flowed over the welded portion to form a chromium oxide passivated film on the welded portion. The process gas is passed through a gas purifier prior to being flowed over the welded portion to maintain its moisture level at less than 1 ppb. A welding and passivation apparatus for carrying out the improved method is also described having a welding system, such as a high speed tungsten-inert gas (TIG) orbital tube welding system or the like, and a gas supply system equipped to deliver the backshield gas, arc gas and process gas with the required compositions and with the proper timing during the welding and passivation process. An electronic timing unit controls the gas supply system to release the gases into the welding head at the proper time during the process.

11 Claims, 1 Drawing Sheet

WELDING APPARATUS FOR FORMING CHROMIUM OXIDE PASSIVATED FILM AT WELDED PORTION

CROSS REFERENCE TO OTHER APPLICATIONS

This application is a divisional application of U.S. patent application Ser. No. 09/163,736, filed Sep. 30, 1998, now U.S. Pat. No. 6,172,320, issued Jan. 9, 2001.

FIELD OF THE INVENTION

The present invention relates to a method for welding and for forming a chromium oxide passivated film at the welded portion, and also to an apparatus for performing the method. More particularly, it relates to an improved method and apparatus for welding and for forming a chromium oxide passivated film at the welded portion with improved reliability and repeatability.

BACKGROUND OF THE INVENTION

There are many circumstances in which it is highly desirable to produce vessels, conduits and other fabricated parts with a continuous, uninterrupted passivated surface film on the interior and/or exterior surface. A passivated surface film provides a relatively inert protective layer on material handling equipment and processing equipment where high purity and low contamination are important. Areas of technology and manufacturing where these are important include production of pharmaceuticals and medical devices and fabrication of high vacuum equipment, such as is used for production of semiconductor devices and superconducting electronic devices. However, when such equipment is fabricated by welding using conventional methods, the welded portions may create an interruption in the passivated surface film. It would be highly desirable in these circumstances to provide a method and apparatus for creating welded joints that have a passivated surface film on the welded portion. It would be even more desirable to provide a method and apparatus for producing the passivated surface film simultaneously with creating the welded joints with high consistency and reliability. Such a method and apparatus would be particularly applicable to the welding of stainless steel, in particular ferritic stainless steels, where it is desirable to produce welded joints having a chromium oxide ($Cr_2O_3$) passivated film at the welded portions.

In the electronic industry, the pace of development of semiconductor devices having high LSI and high performance has increased greatly, and manufacturing apparatuses which are capable of producing such semiconductor devices have been in demand, and energetic efforts have been made to produce atmospheres having a higher degree of vacuum and higher cleanliness. High vacuum apparatuses of this sort are also in demand for other semiconductor manufacturing, superconductor thin film manufacturing, magnetic thin film manufacturing, metallic thin film manufacturing, dielectric thin film manufacturing, or the like; for example, film formation apparatuses or processing apparatuses employing sputtering, vapor deposition, CVD, PCVD, MOCVD, MBE, dry etching, ion implantation, diffusion and oxidation furnaces, or the like, or furthermore, evaluation apparatuses employing Auger electron spectroscopy, XPS, SIMS, RHEED, TREX, or the like.

In order to produce atmospheres having an ultra-high degree of vacuum and having ultra-high cleanliness, it is necessary to completely suppress the release of gas from the apparatus as well as from the gas supply piping system. Previous research efforts in this area have resulted in the development of a chromium oxide passivated film treatment method, so that it has become possible to form, on a surface, an oxide passivated film having chromium oxide as a chief component thereof, which is corrosion resistant and non-catalytic, and which furthermore restricts gas release in the extreme. These previous efforts have succeeded in producing an atmosphere in which the release of gas from the internal portions of the apparatus is restricted to an amount which is difficult to detect with present measuring devices.

However, as such apparatuses have become larger in scale, and as the complexity thereof has increased, it has become increasingly necessary to connect pipes or apparatuses by means of welding after the formation of the chromium oxide passivated film. Because the surface of the welded portions is not covered by a chromium oxide passivated film, gas easily adsorbs thereto and desorbs therefrom, and as the number of welds increases, the gas which is released therefrom reaches a level which is impossible to ignore, so that a new problem is generated in that the atmosphere becomes contaminated.

Furthermore, in apparatuses or piping systems employing corrosive gases or the like, there are problems in that the welded portions are corroded, and as a result of this, the atmosphere becomes contaminated. The formation of an oxide passivated film in apparatuses or piping systems which are large-scale and have complicated forms requires a complex passivated film formation apparatus, and in particular in view of increasing costs, a welding method in which a passivated film can be formed simultaneously with welding has been strongly desired.

U.S. Pat. No. 5,597,109 granted to Tadahiro Ohmi, Shinji Miyoshi and Yasumitsu Mizuguchi describes a welding method for forming a chromium oxide passivated film at a welded portion, including a welding apparatus and process apparatus. The specification of this patent is hereby incorporated by reference in its entirety. In the welding process disclosed, a back shielding gas having a moisture content of 800 ppm (parts per million) to 2.5% is used to encourage formation of a thick passivated film of chromium oxide at the welded portion. While this previous patent represents a significant advance in this technical area, continued research has been directed toward further improvements of such a welding process, in particular toward the goals of ease of operation of the welding system and higher reliability and repeatability of the welding process and of the welded joints produced.

In view of the above points, the present invention has as an object thereof to provide an improved welding and passivation method which is capable of forming an oxide passivated film at the welded portion during the welding process, which is corrosion resistant and non-catalytic and which adsorbs and desorbs extremely little gas at the welded portions and in the heat-affected-zone (HAZ) in the vicinity of the welded portion. In particular, it is an object to provide such a welding and passivation method with easier operation and with higher predictability, reliability and repeatability. Furthermore, the present invention has as a further object thereof to provide a welding and passivation apparatus which is capable of carrying out the improved method.

SUMMARY OF THE INVENTION

In a first aspect of the invention, the welding and passivation method of the present invention includes a welding step, in which a welded area is formed on a substrate, and a passivation step, in which an oxide passivated film is formed on the welded area. Typically, the welding and passivation method will also include a shielding step, in which a protective shield of inert gas is formed around the area to be welded and maintained throughout the welding and passivation steps. The shielding step is initiated by flowing a backshield gas, such as ultrahigh purity argon gas, around the area to be welded to purge contaminants and to form a protective shield of inert gas. In the welding step, an arc gas or welding gas, such as ultrahigh purity argon gas mixed with 5–10% hydrogen, is flowed onto the area to be welded and the area is heated to form a welded joint. Next, in the passivation step, the heat is reduced and the welded area is maintained at a reactive temperature for forming an oxide passivated film and a process gas or passivating gas, such as ultrahigh purity argon gas mixed with 30–100 ppm oxygen, is flowed over the welded area to form an oxide passivated film. After an acceptable oxide passivated film has been formed on the welded area, the process gas is turned off and the backshield gas flows into the area to protect and to help cool the oxide passivated welded area.

In a preferred embodiment, the welding and passivation method of the present invention takes the form of a high speed tungsten-inert gas (TIG) orbital tube welding process. In this embodiment of the invention, the method is used to form oxide passivated welded joints in ferritic stainless steel tubing. In the shielding step, a backshield gas comprising an inert gas, preferably ultrahigh purity argon, is flowed over the welding site to purge contaminants and to create a protective atmosphere around the welding site. In the welding step an arc gas comprising an inert gas mixed with a gaseous reducing agent, preferably ultrahigh purity argon mixed with 5–10% hydrogen is flowed through the high speed TIG orbital welding head and a welding current is applied to produce a welded joint in the tubing. Preferably, the arc gas source is connected directly to the high speed weld head, without passing through the welding power source in order to reduce contamination and to maintain the moisture content at less than approximately 1 ppm. In the passivation step, a process gas that comprises an inert gas mixed with a gaseous oxidizing agent, preferably argon mixed with oxygen at a concentration of approximately 30–100 ppm and having a moisture content of less than approximately 1 ppm, and more preferably less than approximately 1 ppb, is flowed over the welded portion to form a chromium oxide passivated film on the welded portion. Preferably, the process gas is passed through a gas purifier just prior to being flowed over the welded portion to maintain its moisture level at less than approximately 1 ppb. Preferably, when the welding system is not in use, it is continually purged with an inert gas, such as argon, to reduce impurities and contamination. When performed according to this improved method, the welding and passivation process of the present invention reliably and repeatably forms a welded joint with a consistent chromium oxide passivated film having a high chromium oxide content over the welded portion.

A second aspect of the present invention is embodied in a welding and passivation apparatus for carrying out the improved welding method as described herein. In a preferred embodiment, the welding and passivation apparatus is characterized as having a welding head, such as a high speed tungsten-inert gas (TIG) orbital welding head or the like, and a gas supply system equipped to deliver the appropriate backshield gas, arc gas and process gas with the required compositions and with the proper timing during the welding process. The gas supply system has associated with it a source of backshield gas, a source of arc gas and a source of process gas. Each of these gas sources is connected to the welding head by gas supply lines made of metallic and/or polymeric tubing. An electronic timing unit and solenoid assembly control an arc gas valve and a process gas valve to release each of the gases into the welding head at the proper time during the welding process. Preferably, the process gas source also includes a gas purifier that the process gas is passed through just prior to being flowed over the welded portion in order to maintain its moisture level at less than approximately 1 ppb. Optionally, the process gas source may also include a moisture concentration monitor for process control. When operated according to the improved welding and passivation method as described herein, the welding and passivation apparatus of the present invention is capable of reliably and repeatably forming welded joints having a chromium oxide passivated film over the welded portion.

DETAILED DESCRIPTION OF THE INVENTION

Figure 1:
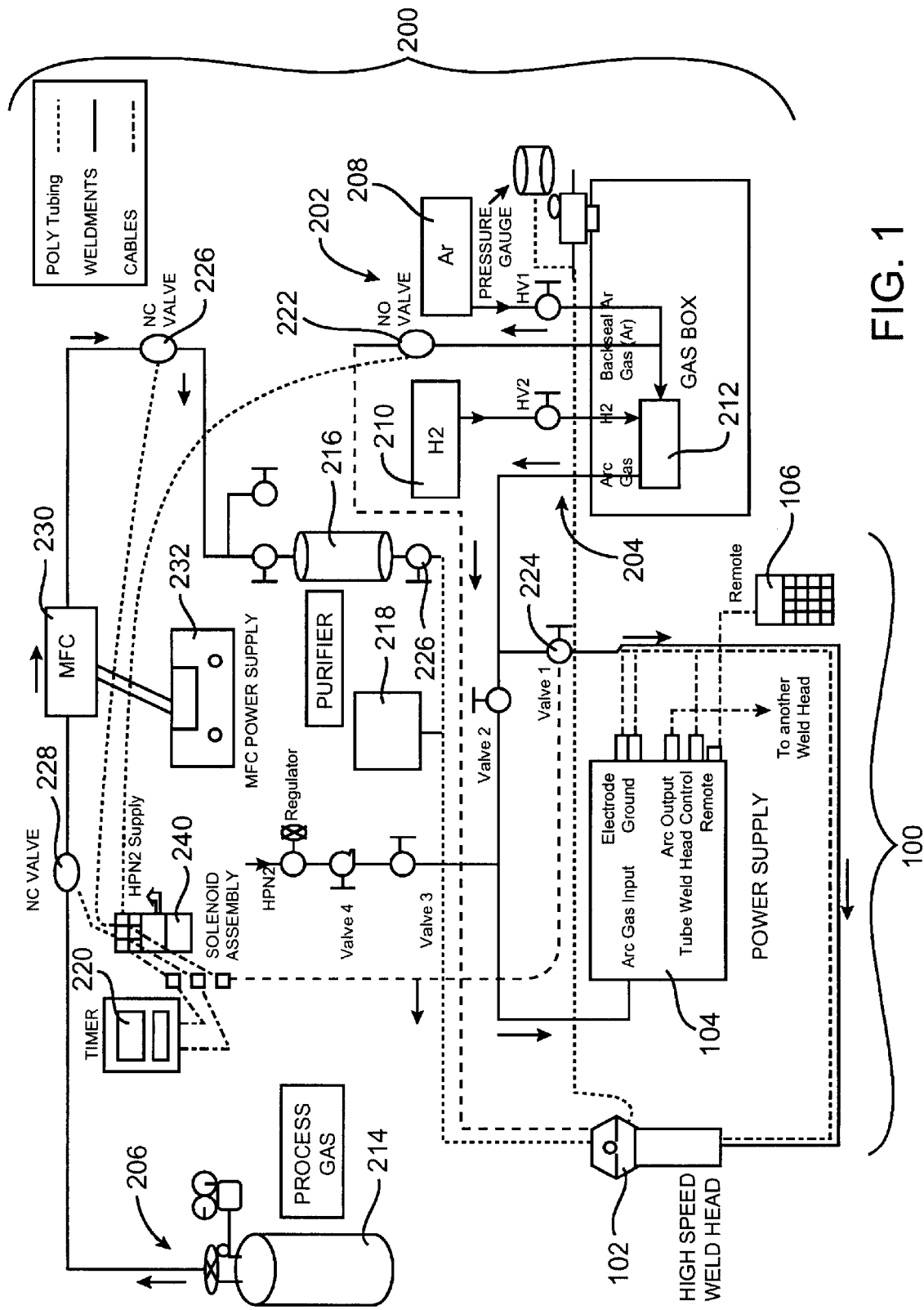
FIG. 1 is a schematic diagram of a welding and passivation apparatus built according to the present invention.

FIG. 1 is a schematic diagram of a welding and passivation apparatus built in accordance with the present invention. In this illustrative embodiment, the welding and passivation apparatus includes a welding system 100 and a gas supply system 200. In one preferred embodiment of the apparatus of the invention, the welding system 100 is in the form of a tungsten-inert gas (TIG or GTAW) welding system. In a particularly preferred embodiment of the apparatus, the welding system 100 is a high speed orbital tungsten-inert gas (TIG) tube welding system that is configured for forming circumferential welded joints between the ends of two tubes or pipes. Alternatively, the welding system 100 may be in the form of any known welding system capable of applying sufficient welding heat to a workpiece without introducing an unacceptable level of contamination, the importance of which will be apparent from the operational description below. Alternative welding systems 100 suitable for this application include systems for laser welding, electron beam welding, arc welding, plasma arc welding, metal-inert gas (MIG or GMAW) welding, resistance welding, friction welding, and other known welding methods.

Generally, the welding system 100 will include a welding head 102 and a welding power supply 104. In the case of a high speed orbital tungsten-inert gas (TIG) tube welding system, the welding head 102 is an orbital tube welding head that is configured for forming circumferential welded joints between the ends of two tubes by rotating a welding electrode, in this case a tungsten electrode, around the tubes during the welding operation. The orbital tube welding head may be a commercially available welding head, for example a Model 9 series automatic orbital tube welding head from AMI-Arc Machines Inc. This model of orbital tube welding head is configured to accommodate tubes up to about half an inch in diameter. Other sizes, makes and models of orbital tube welding heads suitable for this application are also commercially available.

Typically, such orbital tube welding heads rotate around the workpiece at a rate of approximately 10 rpm. However, in a particularly preferred embodiment of the present invention, the gears and/or the motor of the orbital tube welding head are modified to create a high speed tube welding head 102 capable of rotating around the workpiece at a rate of up to approximately 30 rpm or higher. The higher speed of the modified orbital tube welding head allows faster completion of the welded joints and also provides more consistent results in the welding and passivating process, in part by providing faster temperature transitions in the welding step and the passivation step.

The welding power supply 104 in the case of a high speed orbital tungsten-inert gas (TIG) tube welding system may be a commercially available arc welding power supply, such as an AMI 207 automatic orbital tube welding system from AMI-Arc Machines Inc. Optionally, the welding system 100 may also include a remote control unit 106 for remotely operating the welding power supply 104. Other welding power supplies 104 suitable for this application are also commercially available. In a particularly preferred embodiment of the present invention, the welding power supply 104 is also subject to minor modifications in how it interfaces with the gas supply system 200, which will be explained in more detail below.

The gas supply system 200 of the apparatus includes a source of backshield gas 202, a source of arc gas 204 and a source of process gas 206. The physical configuration of the gas supply system 200 is quite variable. In one particularly preferred configuration, the gas sources include large bulk storage tanks of the necessary gases and the gases are piped to the location of the welding system as facility gases. This configuration is particularly applicable to high volume fabrication of welded parts. Alternatively, the different gas sources may be configured with smaller gas storage cylinders. This configuration is more applicable to lower volume fabrication of welded parts and for portable welding operations.

The backshield gas source 202 supplies a backshield gas or shielding gas to the welding system 100 for performing the welding and passivation method. Preferably, the backshield gas is a highly purified inert gas, such as argon or nitrogen. More preferably, the backshield gas is ultrahigh purity argon gas containing less than approximately 1 ppm (parts per million) total contamination level, including moisture ($H_2O$), $CO_2$, oxygen and total hydrocarbons. Generally, the backshield gas source 202 includes a pressurized storage tank or cylinder 208 of backshield gas, for example ultrahigh purity argon gas, as just described. The backshield gas source 202 typically also includes appropriate regulators, valves and piping as necessary for conveying the backshield gas to the welding location and for making connections with the welding system 100. Preferably, all of the components of the backshield gas source 202, including the regulators, valves and piping, are ultralow contamination components in order to minimize contamination of the backshield gas.

The arc gas source 204 supplies an arc gas or welding gas to the welding system 100 for performing the welding step of the welding and passivation method. Generally, the arc gas is a mixture of an inert gas, such as argon or nitrogen, with an appropriate amount of a gaseous reducing agent for effective welding. Preferably, the arc gas is a mixture of argon and approximately 5–10% hydrogen. More preferably, the arc gas is an ultrahigh purity arc gas that is a mixture of argon and approximately 5–10% hydrogen with less than 1 ppm moisture content, and preferably less than approximately 1 ppm total contamination level, including moisture, $CO_2$, oxygen and total hydrocarbons. Generally, the arc gas source 204 includes a pressurized storage tank or cylinder 208 of argon gas, which may be the same argon storage tank 208 as for the backshield gas source 202, a pressurized storage tank or cylinder 210 of hydrogen gas, and a gas mixer 212 for mixing the two gases to form the arc gas and for precisely adjusting the ratio of argon to hydrogen within the arc gas. Typically, the gas mixer 212 comprises two mass flow controllers for individually controlling the flow rate of hydrogen and argon into a common tube where the gases intermix. Alternatively, the arc gas can be premixed to a desired ratio and stored in a separate arc gas storage tank, which simplifies the apparatus somewhat, but precludes the option of adjusting the gas ratio. The arc gas source 204 typically also includes appropriate regulators, valves and piping as necessary for conveying the arc gas to the welding location and for making connections with the welding system 100. Preferably, all of the components of the arc gas source 204, including the regulators, valves and piping, are ultralow contamination components in order to minimize contamination of the arc gas.

In a particularly preferred embodiment of the apparatus, the arc gas source 204 is connected directly to the high speed tube welding head 102 of the welding system 100. This is in contrast to the typical prior art systems where the arc gas is connected to the welding head through the welding power supply. The disadvantage of this prior art arrangement is that the valves and components included in commercially available welding systems are typically not of the ultralow contamination variety. This can introduce 10 ppm or more of moisture and other contaminants into the arc gas, which could interfere with the formation of the chromium oxide passivation layer in the subsequent passivation step. Connecting the arc gas source 204 directly to the high speed tube welding head 102 of the welding system 100 thus reduces the amount of contamination introduced into the arc gas. Alternatively, the welding system 100 may be modified by substituting ultralow contamination components for all components that come in contact with the arc gas.

The process gas source 206 supplies a process gas or passivating gas to the welding system 100 for performing the passivation step of the welding and passivation method. Generally, the process gas is a mixture of an inert gas, such as argon or nitrogen, with an appropriate amount of a gaseous oxidizing agent for effective passivation of the welded area. Preferably, the process gas is a mixture of. argon and approximately 30–100 ppm oxygen. More preferably, the process gas is an ultrahigh purity process gas that is a mixture of argon and approximately 30–100 ppm oxygen with less than 1 ppm moisture content, and preferably less than approximately 1 ppm total contamination level, including moisture, $CO_2$, and total hydrocarbons. Most preferably, the process gas source 206 supplies an ultrahigh purity process gas that is a mixture of argon and approximately 30–100 ppm oxygen with less than approximately 1 ppb (parts per billion) moisture content, and preferably less than approximately 1 ppb total contamination level, including moisture, $CO_2$, and total hydrocarbons. It should be noted that while oxygen is considered a contaminant to be avoided in the backshield gas and the arc gas, oxygen or an equivalent oxidizing agent, is considered an essential component in the process gas mixture.

Generally, the process gas is premixed with the chosen concentration of oxygen within the range of 30–100 ppm and a total contamination level of moisture, $CO_2$, and total hydrocarbons of less than approximately 1 ppm. The premixed process gas is generally supplied in a pressurized storage tank or cylinder 214. Alternatively, the process gas can be mixed to the desired ratio on-site using a gas mixer capable of precise mixing of the component gases at the chosen concentration. A mass flow controller 230, which is powered by a mass flow controller power supply 232, controls the flow rate of process gas from the process gas source 206. The process gas source 206 typically also includes appropriate regulators, valves and piping as necessary for conveying the process gas to the welding location and for making connections with the welding head 102 of the welding system 100. Preferably, all of the components of the process gas source 206, including the regulators, valves and piping, are ultralow contamination components in order to minimize contamination of the process gas. In a particularly preferred embodiment, the process gas source 206 also includes a selective gas purifier 216 for removing moisture and other contaminants from the process gas just prior to flowing it over the welded area. Preferably, the selective gas purifier 216 reduces the moisture content in the process gas to less than approximately 1 ppb. More preferably, the selective gas purifier 216 reduces the total contamination level to less than approximately 1 ppb, including moisture, $CO_2$, and total hydrocarbons. It is important to note that, because oxygen is an essential component in the process gas mixture, a standard argon gas purifier that also removes oxygen as a contaminant must not be used in this application. A selective gas purifier 216 suitable for this application and which removes moisture, $CO_2$ and hydrocarbons, but does not affect oxygen concentration, is commercially available from Aeronex, Inc. of San Diego, Calif.

Optionally, the process gas source 206 may also include a gas moisture content monitor 218 downstream of the selective gas purifier 216 for monitoring the moisture content of the purified process gas. The optional gas moisture content monitor 218 is especially useful for statistical process control methods where passivated weld quality is tracked as a function of moisture contamination. Suitable gas moisture content monitors 218 for this application are commercially available from Ametek, Inc.

The gas supply system 200 of the apparatus also includes an electronic timing unit 220 for controlling the timing of the backshield gas, the arc gas and the process gas during the welding and passivation process. The electronic timing unit 220 controls a solenoid assembly 240 containing solenoid valves that, in turn, control the function of an arc gas pneumatic valve 224 and one or more process gas pneumatic valves 226, 228 to release each these gases into the welding system 100 at the proper time during the welding and passivation process. A backshield gas valve 222 for controlling the flow of backshield gas may be operated by the electronic timing unit 220 and solenoid assembly 240 or, alternatively, by an internal timer and a solenoid or pneumatic valve within the welding power supply 104. Preferably, each of the valves 222, 224, 226, 228 are ultralow contamination valves in order to minimize contamination of any of the gases.

Optionally, the welding system 100 and the gas supply system 200 of the welding and passivation apparatus may be configured with additional valves and connections for converting the welding and passivation apparatus to operate as a standard TIG welding apparatus when welding materials or process apparatus that do not require oxide passivation.

Generally, the welding and passivation method of the present invention includes a welding step, in which a welded area is formed on a substrate, and a passivation step, in which an oxide passivated film is formed on the welded area. Typically, the welding and passivation method will also include a shielding step, in which a protective shield of inert gas is formed around the area to be welded and maintained throughout the welding and passivation steps. Preferably, when the welding system is not in use, it is continually purged with a purified inert gas, such as argon, preferably at a flow rate of approximately 2–5 standard liters per minute (slm), to reduce impurities and contamination. In a preferred embodiment of the method, the shielding step is initiated by flowing a backshield gas, such as ultrahigh purity argon gas, around the area to be welded to purge contaminants and to form a protective shield of inert gas. In the welding step, an arc gas or welding gas, such as ultrahigh purity argon gas mixed with 5–10% hydrogen, is flowed onto the area to be welded and the area is heated to form a welded joint. Next, in the passivation step, the heat is reduced and the welded area is maintained at a reactive temperature for forming an oxide passivated film and a process gas or passivating gas, such as ultrahigh purity argon gas mixed with 30–100 ppm oxygen, is flowed over the welded area to form an oxide passivated film. After an acceptable oxide passivated film has been formed on the welded area, the process gas is turned off and the backshield gas flows into the area to protect and to help cool the oxide passivated welded area.

The method as it has been described is applicable to welding any metals where it is desirable to form an oxide passivated film on the welded area. The method is particularly applicable to the welding of stainless steels, especially ferritic stainless steels with higher chromium content. A particularly preferred embodiment of the welding and passivation method of the present invention adapted for forming oxide passivated weld joints in ferritic stainless steel tubing will now be described. This embodiment of the welding and passivation method is given as an example of how the principles of invention may be applied and is not intended as limiting in any way to the scope of the present invention.

Using the apparatus described above and illustrated in FIG. 1, a workpiece to be welded is placed into the welding head 102 of the welding system 100. If the workpiece to be welded is an end-to-end or overlapping joint between two stainless steel tubes of a process apparatus, a high speed orbital tungsten-inert gas (TIG) tube welding head 102 may be placed around the tubes at the point where they are to be welded in situ. Once the welding and passivation sequence is initiated, the timing unit 220 opens the backshield gas valve 222 and the backshield gas, preferably ultrahigh purity argon gas containing less than approximately 1 ppm total contamination level, including moisture, $CO_2$, oxygen and total hydrocarbons, flows around the area to be welded. Then, the timing unit 220 opens the arc gas valve 224, with the welding current off, and a prepurge of arc gas flows through the meld head 102 to flush any contaminants out of the weld head 102 and away from the area to be welded. Alternatively, backshield gas may be used to prepurge the weld head 102. With the arc gas flowing, the electrode of the orbital weld head 102 is rotated around the area to be welded and a welding current is applied through the electrode to heat the area to form a welded joint between the two tubes. The arc gas is preferably a mixture of argon and approximately 5–10% hydrogen with less than 1 ppm total contamination level, including moisture, $CO_2$, oxygen and total hydrocarbons. To assure a complete circumferential weld joint between the tubes, the electrode of the orbital weld head 102 is rotated at least once, and preferably approximately twice, around the tubes while applying the welding current. The welding current needed to form an optimal welded joint is highly variable, depending on the size, composition and geometry of the parts to be welded and other factors. The welding current should be sufficient to raise the temperature of the welded area to approximately 1100–1800° C. for forming a welded joint in ferritic stainless steel. For welding ferritic stainless steel tubing smaller than approximately one half inch in diameter using the welding system 100 described above, a welding current on the order of approximately 15 amps has been found to be effective.

Once a satisfactory welded joint has been formed, the current through the electrode is reduced to maintain the welded area at a reactive temperature for forming an oxide passivated film. For forming a chromium oxide passivated film on a ferritic stainless steel substrate, the temperature of the welded area during the passivation step is preferably in the range of approximately 300–600° C., and more preferably in the range of approximately 350–45° C. For passivating welded joints on ferritic stainless steel tubing smaller than approximately one half inch in diameter using the welding system 100 described above, a passivation current less than approximately 15 amps has been found to be effective. While the welded area is maintained at the passivation temperature, the timing unit 220 opens the. process gas valve 226 and a process gas, preferably a mixture of argon and approximately 30–100 ppm oxygen with less than 1 ppm, and more preferably less than approximately 1 ppb, total contamination level of moisture, $CO_2$, and total hydrocarbons, flows over the welded area. With the process gas flowing, the electrode of the orbital weld head 102 is rotated at least once, and preferably approximately twice, around the welded area while applying the passivation current to assure a complete circumferential oxide passivated welded joint between the two tubes. For improved consistency of the passivation process, the orbital weld head 102 will preferably be rotated at a reduced speed of approximately 6–10 rpm during the passivation step.

When constructed and operated as described herein, the improved welding and passivation method and apparatus of the present invention reliably and repeatably forms oxide passivated welded joints in ferritic stainless steel substrates having a chromium oxide passivated film with chromium oxide as a principal component formed over the welded area. In statistical quality control studies on circumferential welded joints in ferritic stainless steel tubing, the improved welding and passivation method and apparatus of the present invention achieved passivated welded joints having a chromium oxide passivated film with 90% chromium oxide content over the welded area with 93% confidence levels.

While the present invention has been described herein with respect to the exemplary embodiments and the best mode for practicing the invention, it will be apparent to one of ordinary skill in the art that many modifications, improvements and subcombinations of the various embodiments, adaptations and variations can be made to the invention without departing from the spirit and scope thereof.

What is claimed is:

1. An apparatus for forming a weld and for forming a chromium oxide passivated film on the welded area, the apparatus comprising:

a source of process gas, said process gas comprising argon combined with oxygen at a concentration of approximately 30–100 ppm and with a total impurity content, of moisture and total hydrocarbon content, of less than approximately 1 ppb;

a source of welding gas, said welding gas comprising argon combined with approximately 5–10% hydrogen with a total impurity content, of moisture, oxygen and total hydrocarbon content, of less than approximately 1 ppm;

a source of shielding gas, said shielding gas comprising argon with a total impurity content, of moisture, oxygen and total hydrocarbon content, of less than approximately 1 ppm;

a welding means for applying heat to the area to be welded; and a means for flowing said shielding gas over an area to be welded prior to a welding step, for flowing said welding gas over the area to be welded during the welding step wherein said welding means applies heat to the area to be welded to form a weld, and for flowing said process gas over the welded area subsequent to the welding step to form a chromium oxide passivated film on the welded area.

2. The apparatus of claim 1 wherein said welding means comprises a tungsten inert gas (TIG) welding system.

3. The apparatus of claim 1 wherein said source of process gas comprises a selective gas purifier for reducing the moisture content of said process gas to less than approximately 1 ppb.

4. The apparatus of claim 1 wherein said source of process gas comprises a moisture content monitor for monitoring the moisture content of said process gas.

5. The apparatus of claim 1 wherein said welding means comprises a means for passing an electrical current through the area to be welded to heat the area to be welded to a welding temperature and for passing an electrical current through the welded area to maintain the welded area at a reactive temperature for forming chromium oxide.

6. The apparatus of claim 1 further comprising a means for maintaining the welded area at a reactive temperature for forming chromium oxide during the passivation step.

7. The apparatus of claim 1 further comprising a means for maintaining the welded area at a temperature of approximately 300–600° C. during the passivation step.

8. The apparatus of claim 1 further comprising a means for rotating a welding head about the area to be welded during the welding step and during the passivation step.

9. The apparatus of claim 1 wherein said source of process gas comprises a selective gas purifier for reducing the moisture content of said process gas to less than approximately 1 ppb and a moisture content monitor for monitoring the moisture content of said process gas; and wherein said welding means comprises a tungsten inert gas (TIG) welding system for passing an electrical current through the area to be welded to heat the area to be welded to a welding temperature and for passing a reduced electrical current through the welded area to maintain the welded area at a reactive temperature of approximately 300–600° C. for forming chromium oxide.

10. The apparatus of claim 9 further comprising a means for rotating a welding head about the area to be welded during the welding step and during the passivation step.

11. The apparatus of claim 1, wherein said source of process gas comprises a selective gas purifier that removes moisture and hydrocarbons, but does not remove oxygen, from said process gas to reduce the total impurity content, of moisture and total hydrocarbon content, to less than approximately 1 ppb prior to flowing said process gas onto the welded area.

* * * * *